United States Patent [19]
Joe

[11] Patent Number: 5,796,559
[45] Date of Patent: Aug. 18, 1998

[54] SIGNAL TRANSMITTING DEVICE WITH AN OPTICAL COUPLER FOR USE IN A HEAD DRUM ASSEMBLY

[75] Inventor: Yeo-Uk Joe, Seoul, Rep. of Korea

[73] Assignee: Daewoo Electronics Co., Ltd., Seoul, Rep. of Korea

[21] Appl. No.: 721,516

[22] Filed: Sep. 26, 1996

[30] Foreign Application Priority Data

Sep. 30, 1995 [KR] Rep. of Korea ............... 1995 27405

[51] Int. Cl.⁶ .................... G11B 5/52; G11B 5/027
[52] U.S. Cl. ............................ 360/108; 360/84
[58] Field of Search ................. 360/108, 84, 85, 360/77.13, 77.16, 77.02

[56] References Cited

U.S. PATENT DOCUMENTS

| | | | |
|---|---|---|---|
| 4,511,934 | 4/1985 | Ohira et al. | 360/55 |
| 4,814,902 | 3/1989 | Fujiwara et al. | 360/33.1 |
| 4,819,096 | 4/1989 | Grant et al. | 360/108 |
| 4,967,290 | 10/1990 | Grant et al. | 360/64 |
| 4,973,123 | 11/1990 | Lutzeler | 350/96.15 |
| 5,373,404 | 12/1994 | Katou et al. | 360/84 |
| 5,384,676 | 1/1995 | Yokoyama et al. | 360/77.13 |

FOREIGN PATENT DOCUMENTS

| | | |
|---|---|---|
| 02-158901 | 6/1990 | Japan . |
| 0131606 | 5/1994 | Japan . |

*Primary Examiner*—Allen Cao
*Attorney, Agent, or Firm*—Anderson Kill & Olick, P.C.

[57] ABSTRACT

A signal transmitting device for use in a head drum assembly includes a fixed shaft, a rotary drum rotatably mounted around the fixed shaft, at least two magnetic heads arranged on and attached to the rotary drum with a same angular separation therebetween, a same number of laser diodes as the magnetic heads, each of the laser diodes being capable of converting electrical signal produced in the magnetic heads into optical signal and emitting the optical signal toward a center of the fixed shaft and a photo diode adapted to receive the optical signal from one of the laser diodes and to convert the received optical signal into electrical signal.

3 Claims, 3 Drawing Sheets

SIGNAL TRANSMITTING DEVICE WITH AN OPTICAL COUPLER FOR USE IN A HEAD DRUM ASSEMBLY

FIELD OF THE INVENTION

The present invention relates to a head drum assembly; and, more particularly, to a signal transmitting device designed to effectively transmit signals from a rotary drum by using photo-electric elements.

DESCRIPTION OF THE PRIOR ART

There is shown in FIG. 1, a conventional head drum assembly 100 having two magnetic heads used in a tape player. As shown, the head drum assembly 100 includes a rotary drum 50 rotatably mounted around an upper portion of a fixed shaft 80 by a pair of ball bearings 90, and a stationary drum 60 supporting the fixed shaft 80 in a press-fit relationship therebetween.

Mounted between the rotary and the stationary drums 50 and 60 are a rotor and a stator transformers 30 and 40 which are used to transmit electrical signals from the rotary drum 50 to the stationary drum 60 and vice versa. The rotor and the stator transformers 30 and 40 are vertically spaced apart from each other to thereby form an air gap therebetween.

A pair of magnetic heads 10 and 20 is arranged on and attached to a bottom surface of the rotary drum 50, each of the magnetic heads 10 and 20 being separated from each other by 180°.

Mounted above the rotary drum 50 is a driving motor 70. When the driving motor 70 is energized, the rotary drum 50 rotates, with the magnetic heads 10 and 20 thereon generating electrical signals corresponding to information stored on a magnetic tape(not shown).

The electrical signals generated by the magnetic heads 10 and 20 are transmitted first to the rotor transformer 30 through a wire or the like and then to the stator transformer 40 through magnetic induction. The electrical signals magnetically induced onto the stator transformer 40 are finally sent to a reproducing circuit of the tape player.

The magnetic induction-based signal transmission between the rotary and the stator transformers, however, has a number of shortcomings. For example, undesirable noise signals are often added to the original electrical signals from the magnetic heads 10 and 20. Moreover, since the air gap between both transformers must be very precisely adjusted for a proper signal transmission therebetween, an extreme care must be taken in assembling the head drum assembly.

SUMMARY OF THE INVENTION

It is, therefore, a primary object of the present invention to provide a head drum assembly which can be easily assembled and capable of ensuring noise-free signal transmission between a rotary and a stationary drums.

In accordance with the present invention, there is provided a signal transmitting device for use in a head drum assembly, the device comprising: a fixed shaft; a rotary drum rotatably mounted around the fixed shaft; at least two magnetic heads arranged on and attached to the rotary drum with a same angular separation therebetween; a same number of electro-optic means as the magnetic heads, each of the electro-optic means capable of converting electrical signal produced in the magnetic heads into optical signal and emitting the optical signal toward a center of the fixed shaft, each of the electro-optic means being separated from each other by the same angular separation as the magnetic heads; and an opto-electric means adapted to receive the optical signal from one of the electro-optic means and to convert the optical signal into a corresponding electrical signal, the optic-electric means attached to a lateral external surface of the fixed shaft.

BRIEF DESCRIPTION OF THE DRAWINGS

The above and other objects and features of the present invention will become apparent from the following description of preferred embodiments taken in conjunction with the accompanying drawings, in which.

DETAILED DESCRIPTION OF THE PREFERRED EMBODIMENTS

For purpose of description, the present invention will be described with respect to a video tape player employing a head drum assembly with two magnetic video heads.

Figure 1:
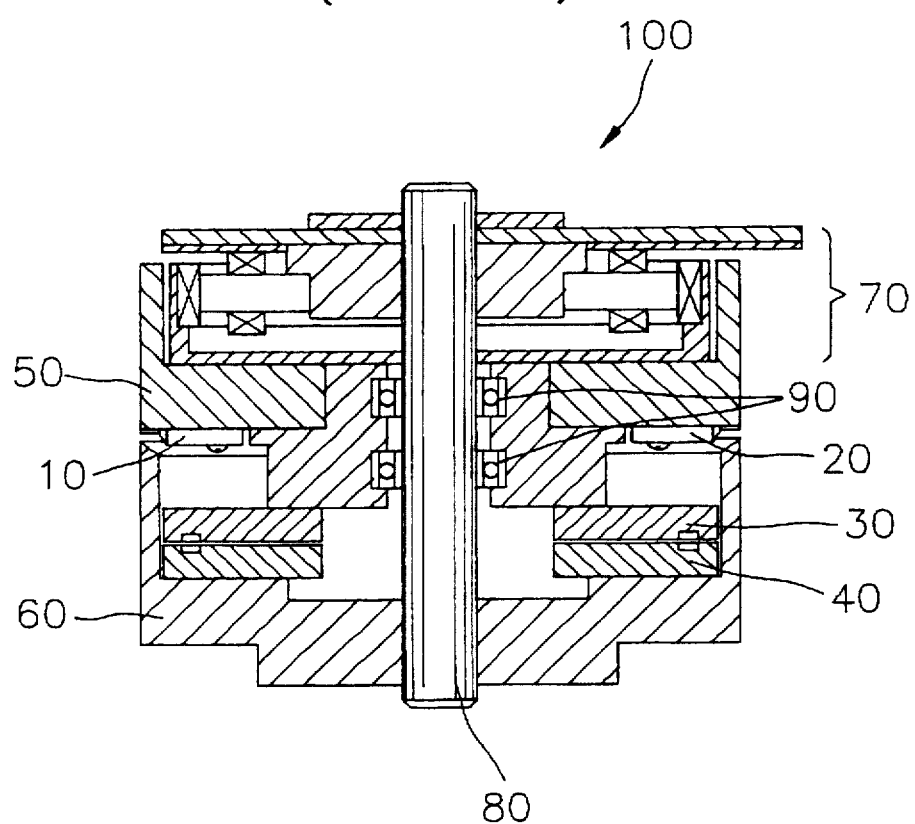
FIG. 1 shows a conventional head drum assembly using a rotor and a stator transformers.
Figure 2:
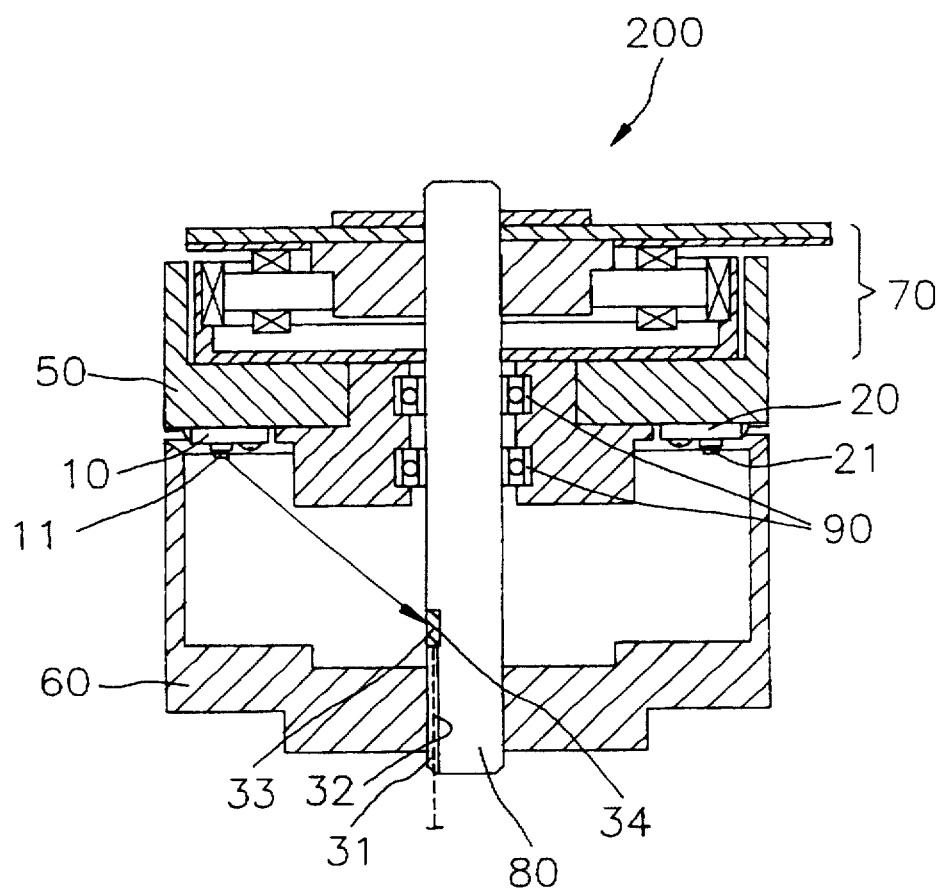
FIG. 2 illustrates a head drum assembly using a signal transmitting device in accordance with the present invention.
Figure 3:
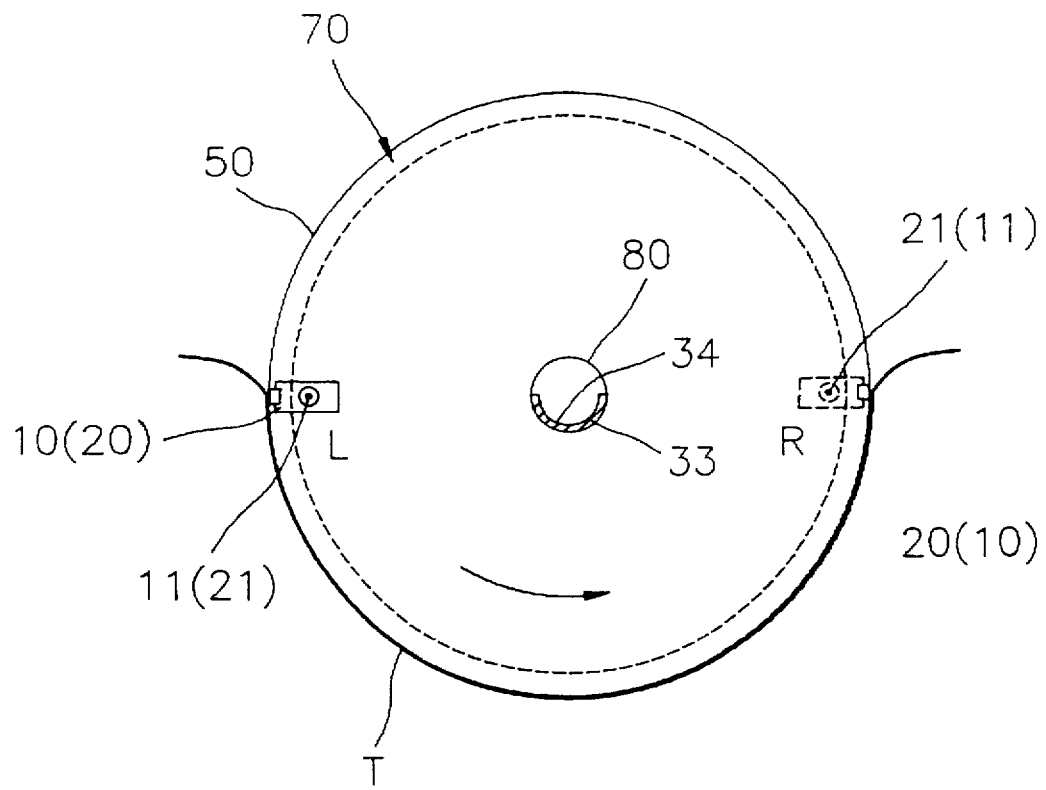
FIG. 3 offers a schematic top view of the head drum assembly employing the inventive signal transmitting device.

FIGS. 2 and 3 show a signal transmitting device for use in the head drum assembly in accordance with the present invention. Elements similar to those in FIG. 1 are given same reference numerals.

As shown in FIG. 2, the head drum 200 includes a stationary drum 60 supporting a fixed shaft 80 in a press-fit relationship therewith and a rotary drum 50 rotatably mounted around the fixed shaft 80 through a pair of ball bearings 90. A pair of video heads 10 and 20 is mounted on a bottom portion of the rotary drum 50. When the rotary drum 50 is rotated by a driving motor 70, the video heads produce electrical signals corresponding to information stored on a magnetic tape(not shown).

A pair of light emitter 11 and 12 are fixed to the video heads 10 and 20, respectively. The light emitters 11 and 21 convert the electrical signals from the video heads 10 and 20 into corresponding optical signals and emit those optical signals toward the axis of rotation of the video heads 10 and 20. The light emitters 11 and 21 are electrically connected to the corresponding video heads 10 and 20, respectively. Preferably, photo diodes, e.g., a laser diode, are used as the light emitters 11 and 21.

On the other hand, a mounting surface 34 is prepared on a lateral portion of the fixed shaft 80 on which an arcuated light receiver 33 is mounted. The arcuated light receiver 33 detects the optical signals emitted from the light emitters 11 and 21 and converts those signals into electrical signals again. The converted signals by the arcuated light receiver 33, i.e., the electrical signals, are transferred to a main reproducing circuit through a connecting lead 32. In order to guide the connecting lead 32, a guiding groove 31 is formed on a lower portion of the fixed shaft 80.

The arcuated light receiver 33 is so circumferentially dimensioned as to cover an angular range of 180° about the center of the fixed shaft 80. Various kinds of photo detecting devices or elements can be used as the arcuated light receiver 33.

Figure 4:
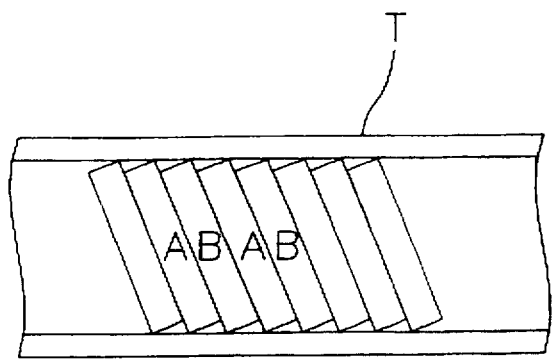
FIG. 4 represents a magnetic tape containing a plurality of tracks thereon.

Operation of the signal transmitting device in accordance with the present invention is now described with reference to FIGS. 3 and 4.

As shown in FIG. 3, when the driving motor 70 is energized, the rotary drum 50, including the video heads 10 and 20 attached thereto also rotates. For example, when the video head 10 is rotated counterclockwise from a position L in FIG. 3, scanning a track A of the magnetic tape T as shown in FIG. 4, reading information stored thereon, there are generated corresponding electrical signals in the video head 10. The generated electrical signals by the video head 10 are converted into the optical signals and emitted toward the arcuated light receiver 33 by the light emitter 11.

No signal is emitted by the light emitter 21 of the video head 20, since the magnetic tape T is not contacted with the video head 20; and even if noise signals are generated in the video head 20 which are, in turn, converted into optical signals and emitted by the light emitter 21, the arcuated light receiver 33 cannot detect the converted optical signals therefrom. When the video head 10 finishes the scanning the track A of the magnetic tape T, i.e., the same 10 arrives at a position R in FIG. 3, the video head 20 starts scanning a track B on the magnetic tape T. The electrical signals from the video head 20 are converted into optical signals and emitted to the arcuated light detector 33 by the light emitter 21. During the signal transmission by the video head 20, the signals from the video head 10 are blocked off.

In this manner, the arcuated light receiver 33 alternately detects the optical signals from the light emitter 11 and 21 and transmits those signals to the main reproducing circuit, thereby alleviating a need to employ a separate head switching circuit required in the conventional video tape player.

Although the present invention was described with respect to the two head type head drum assembly, the inventive signal transmitting device using electro-optic and opto-electric elements can be also used in case of four head type head drum assembly by employing angularly and equally spacing four light emitters and a light receiver so circumferentially dimensioned to cover an angular range of 90°.

Although the invention has been shown and described with respect to the preferred embodiments, it will be understood by those skilled in the art that various changes and modifications may be made without departing from the spirit and scope of the invention as defined in the following claims.

What is claimed is:

1. A signal transmitting device for use in a head drum assembly, the device comprising:

a fixed shaft;

a rotary drum rotatably mounted around the fixed shaft;

at least two magnetic heads for reading data from a magnetic tape, arranged on and attached to the rotary drum with a same angular separation therebetween;

a same number of electro-optic means as that of the magnetic heads, each of the electro-optic means capable of converting an electrical signal produced in the magnetic heads into an optical signal and emitting the optical signal toward a center of the fixed shaft, each of the electro-optic means being separated from each other by the same angular separation as the magnetic heads; and an arcuated opto-electric means attached to a lateral external surface of said fixed shaft, having a circumferential dimension enabling to continuously receive the optical signal from one of the electro-optic means while its corresponding magnetic head reads the data from said magnetic tape and being capable of converting the optical signal into a corresponding electrical signal.

2. The signal transmitting device of claim 1 further includes a connecting lead for transmitting the corresponding electrical signal to a main reproducing circuit.

3. The signal transmitting device of claim 2 further includes a guiding groove for guiding the connecting lead on a lower portion of the fixed shaft.

* * * * *

UNITED STATES PATENT AND TRADEMARK OFFICE
CERTIFICATE OF CORRECTION

PATENT NO. : 5,796,559
DATED       : Aug. 18, 1998
INVENTOR(S) : Yeo-Uk Joe

It is certified that error appears in the above-identified patent and that said Letters Patent is hereby corrected as shown below:

On title page, item [30] should read as follows:

[30]  Foreign Application Priority Data

Sep. 30, 1995   [KR]   Rep. of Korea           95-27405

Signed and Sealed this

First Day of December, 1998

Attest:

BRUCE LEHMAN

Attesting Officer    Commissioner of Patents and Trademarks